United States Patent [19]

Abe et al.

[11] 4,325,348

[45] Apr. 20, 1982

[54] EXHAUST GAS RECIRCULATION SYSTEM FOR INTERNAL COMBUSTION ENGINE

[75] Inventors: Yoshiharu Abe, Wako; Osamu Gotoh, Higashikurume; Akinobu Takagi, Yokohama, all of Japan

[73] Assignee: Honda Giken Kogyo Kabushiki Kaisha, Tokyo, Japan

[21] Appl. No.: 167,396

[22] Filed: Jul. 8, 1980

[30] Foreign Application Priority Data

Jul. 16, 1979 [JP] Japan .................. 54-89247

[51] Int. Cl.³ .............................................. F02M 25/06
[52] U.S. Cl. .................................. 123/571; 123/568
[58] Field of Search ......................... 123/571, 568, 569

[56] References Cited

U.S. PATENT DOCUMENTS

| | | | |
|---|---|---|---|
| 4,033,308 | 7/1977 | Hayashi et al. | 123/119 A |
| 4,050,429 | 9/1977 | Yasuhiro et al. | |
| 4,171,688 | 10/1979 | Takahashi | 123/571 |
| 4,180,033 | 12/1979 | Aoyama . | |
| 4,187,811 | 2/1980 | Katoh et al. | |
| 4,233,947 | 11/1980 | Abo | 123/571 |
| 4,235,207 | 11/1980 | Nishimura | 123/568 |
| 4,242,998 | 1/1981 | Shioya et al. | 123/568 |

FOREIGN PATENT DOCUMENTS 1486651  9/1977  United Kingdom .

Primary Examiner—Wendell E. Burns
Attorney, Agent, or Firm—Lyon & Lyon

[57] ABSTRACT

An exhaust gas recirculation system for an internal combustion engine employs a first control valve in an exhaust gas introduction passageway, a second control valve in an air conduit connecting the engine intake passage to atmosphere, and a regulating valve responsive to differential vacuum intensities for operating vacuum-responsive actuators for the control valves. A recirculation stop valve vents to atmosphere the actuator for the second control valve in response to an engine operating condition, to stop recirculation of exhaust gas.

4 Claims, 1 Drawing Figure

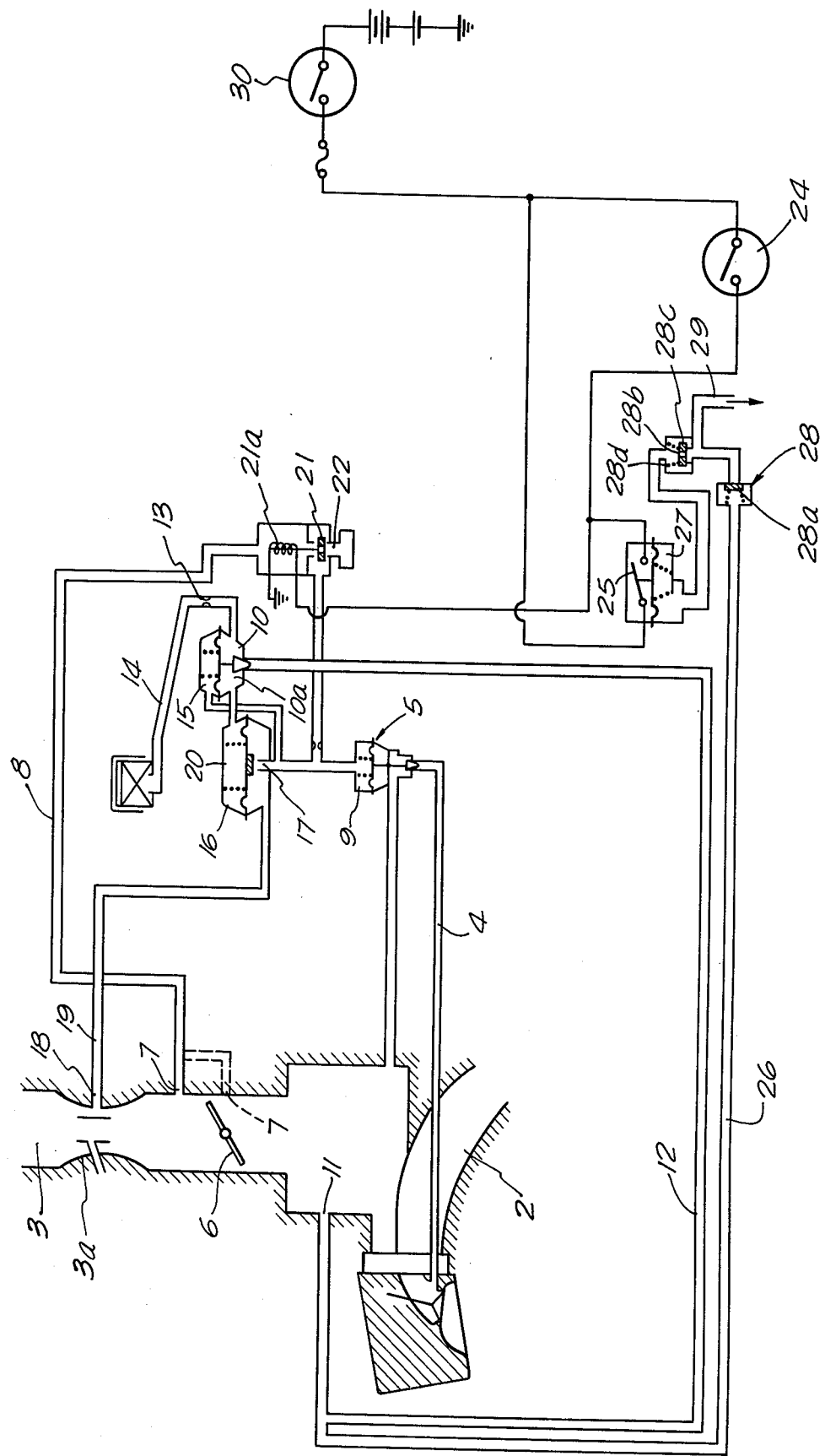

EXHAUST GAS RECIRCULATION SYSTEM FOR INTERNAL COMBUSTION ENGINE

This invention relates to exhaust gas recirculation systems for internal combustion engines, particularly those engines for powering a vehicle.

In conventional exhaust gas recirculation systems, a control valve in the recirculation passageway is operated by a vacuum actuator, which causes the control valve to close and stop recirculation during short time intervals such as temporary deceleration when the engine speed is reduced by gear changes in the transmission. This shutoff of exhaust gas recirculation during short time intervals is disadvantageous in respect of exhaust gas purification. Also, at each reduction or change of speed, the recirculation of exhaust gas is repeatedly begun and interrupted, thus spoiling driving performance. Such conventional systems do not achieve smooth driving of the vehicle.

Accordingly, the principal object of the present invention is to eliminate such drawbacks of conventional exhaust gas recirculation systems for use with internal combustion engines.

Other objects and advantages will appear hereinafter.

The drawing is a schematic diagram showing a preferred embodiment of this invention.

Referring to the drawing, the internal combustion engine 1 of conventional design is provided with the usual exhaust passage 2 and intake passage 3. An exhaust gas recirculation passageway 4 carries a portion of the exhaust gas from the engine 1 through first control valve 5 and back into the engine intake passage 3. The control valve 5 controls flow of exhaust gas recirculation, and has a vacuum actuator with a vaccum pressure chamber 9. This chamber 9 is in communication with vacuum outlet 7 near throttle valve 6 by way of vacuum pressure line 8. Alternately, the line 8 may communicate with vacuum outlet 7′ located slightly downstream of the throttle valve 6. The control valve 5 operates in response to a predetermined level of vacuum pressure within the chamber 9 to open or close the recirculation passageway 4 from the engine exhaust passage 2 to the intake passage 3.

A second control valve 10 controls air flow through air conduit 12 which extends from vacuum outlet 11 located downstream of the throttle valve 6 within the intake passage 3. An air inlet passage 14 extends from the air suction control valve 10 to atmosphere, through the orifice 13. The air suction control valve 10 also incorporates a vacuum actuator having a vacuum chamber 15 connected to the line 8. Thus, the air suction control valve 10 is also responsive to a predetermined level of vacuum pressure within the line 8 to control the rate of air flow in the air conduit 12.

The regulating valve 16 is responsive to differential vacuum pressure; it incorporates a vacuum pressure chamber 20 connected to a front chamber 10a of said air suction control valve 10. Depending on the differential pressure of the suction pressure within said front chamber 10a with respect to the suction pressure in the Venturi throat 3a in the intake passage 3, the regulating valve 16 controls the communication between a leak hole 17 located in the line 8 and a suction line 19 extending from the vacuum outlet 18.

An exhaust gas recirculation stop valve 21 is positioned in the line 8 and is operated by a solenoid 21a to open or close the port 22 leading to atmosphere. Connected in parallel with the electric circuit 23 for the solenoid 21a are a water-temperature sensor 24 and a vacuum pressure switch 25. When energized, the solenoid 21a opens the port 22 to atmosphere. This action stops exhaust gas recirculation. The water-temperature sensor 24 is constructed so that its contacts close, for example, when the temperature of cooling water in the engine 1 drops to less than 60° C.

When the ignition key switch 30 is closed, the water-temperature switch 24 and the vacuum pressure switch 25 are supplied with electric energy. The vacuum pressure switch 25 is caused to actuate in response to suction pressure downstream of the throttle valve 6 in the intake passage 3. For this purpose the switch 25 incorporates a vacuum chamber 27 communicating with a vacuum pressure line 26 branched off from the vacuum outlet 11.

The line 26 contains a delay valve 28 which comprises a check valve 28a and a valve plate 28c, the latter having a central orifice 28b. Valve plate 28c is subjected to the force of the spring 28d acting to close the line 26. When the vacuum pressure within the vacuum chamber 27 causes the valve plate 28c to open the line 26, the vacuum chamber 27 communicates with the atmosphere through the discharge port 29.

In operation, exhaust gas recirculation control valve 5 is opened by the vacuum pressure in the line 8 when the throttle valve 6 is open. Exhaust gas in the exhaust passage 2 is partially recirculated through the exhaust gas recirculation passageway 4 into the intake passage 3 and mixed with the air-fuel mixture passing into the engine 1. Thus, exhaust gas introduced into the combustion chambers of the engine 1 acts to reduce the emission of $NO_x$ in the exhaust passage 2.

While the water temperature is still low during initial operation of the engine, the contacts of the water-temperature sensor 24 are closed. When the vehicle powered by the engine 1 decelerates, the vacuum pressure switch 25 closes. In either case the exhaust gas recirculation stop valve 21 connects the line 8 to atmosphere, this closing the exhaust gas recirculation control valve 5 and stopping the recirculation of exhaust gas to the engine. In this way, the driving performance of the engine at both start-up and deceleration is improved, while emission of HC is reduced.

Since the delay valve 28 is positioned in the vaccum pressure line 26, exhaust gas recirculation stop valve 21 is not actuated in case of a temporary deceleration condition, such as short intervals when gear changing occurs in the transmission. Accordingly, recirculation of exhaust gas continues during such short intervals of time, thus attaining a smooth driving of the engine without bad effects on the driving performance.

Having fully described our invention, it is to be understood that we are not to be limited to the details herein set forth but that our invention is of the full scope of the appended claims.

We claim:

1. In an internal combustion engine having an intake passage for delivering an air-fuel mixture into the engine, the intake passage having a throttle valve and having a Venturi portion, the combination of: an exhaust passage for carrying exhaust gases from the engine, means including a passageway connecting said exhaust passage to said intake passage downstream from said throttle valve for recirculating exhaust gases into the engine, a first control valve in said passageway, an air conduit connecting said intake passage to atmosphere, a second control valve in said air conduit, each of said control valves having a vacuum-responsive actuator, an electrically operated valve for venting to atmosphere the actuator for the first control valve, means responsive to an engine operating condition for actuating said electrically operated valve, and a regulating valve for controlling vacuum intensity in the actuator for each said control valve, said regulating valve being responsive to differential vacuum pressure between vacuum pressure in said Venturi portion and vacuum pressure in said air conduit.

2. The combination set forth in claim 1 in which the latter said means includes delay means.

3. The combination set forth in claim 1 in which the engine operating condition is the temperature of coolant in the engine.

4. The combination set forth in claim 1 in which the engine operating condition is suction pressure in said intake passage.

* * * * *